US012700819B2

(12) United States Patent
Ajima et al.

(10) Patent No.: US 12,700,819 B2
(45) Date of Patent: Aug. 4, 2026

(54) INVERTER CONTROL DEVICE, ELECTRIC POWER STEERING SYSTEM, AND ELECTRIC VEHICLE SYSTEM

(71) Applicant: Hitachi Astemo, Ltd., Hitachinaka (JP)

(72) Inventors: Toshiyuki Ajima, Tokyo (JP); Shun Taniguchi, Tokyo (JP); Noriya Nakao, Tokyo (JP); Takuya Nemoto, Hitachinaka (JP); Kosei Goto, Hitachinaka (JP); Kentaro Matsuo, Hitachinaka (JP); Keiji Kadota, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 199 days.

(21) Appl. No.: 18/686,201

(22) PCT Filed: Feb. 15, 2022

(86) PCT No.: PCT/JP2022/005924
§ 371 (c)(1),
(2) Date: Feb. 23, 2024

(87) PCT Pub. No.: WO2023/037579
PCT Pub. Date: Mar. 16, 2023

(65) Prior Publication Data
US 2025/0192711 A1      Jun. 12, 2025

(30) Foreign Application Priority Data

Sep. 13, 2021    (JP) ................................. 2021-149005

(51) Int. Cl.
| | |
|---|---|
| *H02P 27/08* | (2006.01) |
| *B60L 15/00* | (2006.01) |
| *B62D 5/04* | (2006.01) |

(52) U.S. Cl.
CPC ............ *H02P 27/08* (2013.01); *B60L 15/007* (2013.01); *B62D 5/046* (2013.01)

(58) Field of Classification Search
CPC ........ H02P 27/06; H02P 27/08; H02P 27/085; H02P 29/50; H02P 2207/05;
(Continued)

(56) References Cited

U.S. PATENT DOCUMENTS 5,680,299 A * 10/1997 Yasuda ............... H02M 7/5395
363/41
2015/0251692 A1* 9/2015 Mikamo ............... B60L 15/025
318/504
(Continued)

FOREIGN PATENT DOCUMENTS

JP          62-16076 A     1/1987
JP          9-308256       11/1997
(Continued)

OTHER PUBLICATIONS

International Search Report (PCT/ISA/210) issued in PCT Application No. PCT/JP2022/005924 dated Apr. 5, 2022 with English translation (4 pages).
(Continued)

*Primary Examiner* — Antony M Paul
(74) *Attorney, Agent, or Firm* — Crowell & Moring LLP

(57) ABSTRACT

An inverter control device includes a pulse width modulation (PWM) pulse generation unit that generates a PWM pulse signal for controlling an inverter in every predetermined control cycle, wherein the PWM pulse generation unit generates the PWM pulse signal to meet a pulse generation condition that at least three or more pulses exist in one cycle of a fundamental of an output voltage from the inverter and a state of the PWM pulse signal is switched between on and off at a zero crossing point at which the fundamental changes across zero while generating a PWM pulse signal asynchronous with the control cycle.

6 Claims, 9 Drawing Sheets

(58) Field of Classification Search
CPC .... H02P 2207/01; H02P 25/098; H02P 25/10;
H02P 25/064; H02P 25/022; H02P 21/00;
H02P 21/14; H02P 6/10; H02M 7/5395;
B62D 5/046; B62D 5/04; B60L 50/61
See application file for complete search history.

(56) References Cited

U.S. PATENT DOCUMENTS

| | | |
|---|---|---|
| 2016/0211790 A1 | 7/2016 | Ajima et al. |
| 2019/0363646 A1 | 11/2019 | Ajima et al. |
| 2022/0247328 A1 | 8/2022 | Ajima et al. |

FOREIGN PATENT DOCUMENTS

| | | |
|---|---|---|
| JP | 2015-19458 A | 1/2015 |
| JP | 2016-185021 A | 10/2016 |
| JP | 2018-133935 A | 8/2018 |
| JP | 2021-52442 A | 4/2021 |

OTHER PUBLICATIONS

Japanese-language Written Opinion (PCT/ISA/237) issued in PCT Application No. PCT/JP2022/005924 dated Apr. 5, 2022 with English translation (5 pages).
Indian-language Examination Report issued in Indian Application No. 202417015806 dated Apr. 1, 2026 with English translation (6 pages).

\* cited by examiner

FIG. 3A PWM TIMER (CARRIER PERIODIC SIGNAL)

FIG. 3B MODULATED WAVE SIGNAL

FIG. 3C PWM PULSE

INVERTER CONTROL DEVICE, ELECTRIC POWER STEERING SYSTEM, AND ELECTRIC VEHICLE SYSTEM

TECHNICAL FIELD

The present invention relates to an inverter control device, an electric power steering system and an electric vehicle system using the inverter control device.

BACKGROUND ART

An inverter control device that controls driving of an inverter by pulse width modulation (PWM) control and rotationally drives a motor has been widely used. A known technique is to, in such an inverter control device, operate the inverter in an overmodulation mode (overmodulation region) in which an output voltage command of the inverter exceeds a maximum output level (sine wave) of the inverter for increasing a rotation speed of the motor, and to operate the inverter in one pulse mode (one pulse region) in which PWM pulse trains are connected to form one pulse for further increasing the output voltage.

When the inverter control device is operated from the overmodulation region to the one pulse region, a voltage error occurs at the output of the inverter, and a direct current (DC) component and a ripple component included in the output current of the inverter increase. Thus, an output torque fluctuation, and noise and vibration of the motor occur. Therefore, a demanded technique is to suppress a voltage error in a region where the overmodulation region shifts to the one pulse region and to reduce a DC component and a ripple component of a current.

A technique of PTL 1 is known for reducing current ripples in the overmodulation region. PTL 1 describes an inverter device that generates a PWM pulse so that, when trapezoidal wave modulation using a trapezoidal wave is performed in the overmodulation region, values obtained by integrating areas of on pulses and off pulses of a plurality of PWM pulses in an inversion region of a modulated wave that changes from a bottom side to a top side of the trapezoidal wave become equal to each other.

CITATION LIST

Patent Literature

PTL 1: JP 2015-19458 A

SUMMARY OF INVENTION

Technical Problem

In the technique of PTL 1, the periodicity of pulse trains that repeat in positive and negative (180 degrees) cycles of a modulated wave cannot be appropriately controlled in an operation state of a motor where the number of PWM pulses decreases. Therefore, an error may occur in the output voltage of the inverter, and the DC component and the lower-order harmonic component may increase in the output current of the inverter.

Solution to Problem

An inverter control device of the present invention includes a pulse width modulation (PWM) pulse generation unit that generates a PWM pulse signal for controlling an inverter in every predetermined control cycle. The PWM pulse generation unit generates the PWM pulse signal to meet a pulse generation condition that at least three or more pulses exist in one cycle of a fundamental of an output voltage from the inverter and a state of the PWM pulse signal is switched between on and off at a zero crossing point at which the fundamental changes across zero while generating a PWM pulse signal asynchronous with the control cycle.

An electric power steering system of the present invention includes the inverter control device, the inverter that is controlled by the inverter control device, and an alternating current (AC) motor that is driven by the inverter. The AC motor controls steering of a vehicle.

An electric vehicle system of the present invention includes the inverter control device, the inverter that is controlled by the inverter control device, and an AC motor that is driven by the inverter. The AC motor causes the electric vehicle system to travel using a drive force.

Advantageous Effects of Invention

According to the present invention, it is possible to reduce a DC component and a lower-order harmonic component of the inverter output current generated in an operation state of the motor where the number of the PWM pulses decreases.

DESCRIPTION OF EMBODIMENTS

The present invention provides an inverter control device that controls an inverter by pulse width modulation (PWM) control. In a motor operation state where the number of PWM pulses is smaller than a predetermined value, when, for example, performing PWM pulse control in accordance with a modulation method (sine wave modulation, two-phase modulation, trapezoidal wave modulation, and the like) in order to reduce power consumption of a battery or heat generation of the inverter, the inverter control device generates an edge of a PWM pulse at a timing corresponding to zero crossing of a modulated wave, and outputs a PWM pulse where PWM pulse trains of a 180 degree cycle of the modulated wave maintains repetitive symmetry, resulting in increasing output of the inverter while a DC component and a lower-order harmonic component of an output current from the inverter is reduced. Embodiments of the present invention will be described below with reference to the drawings.

First Embodiment

Figure 1:
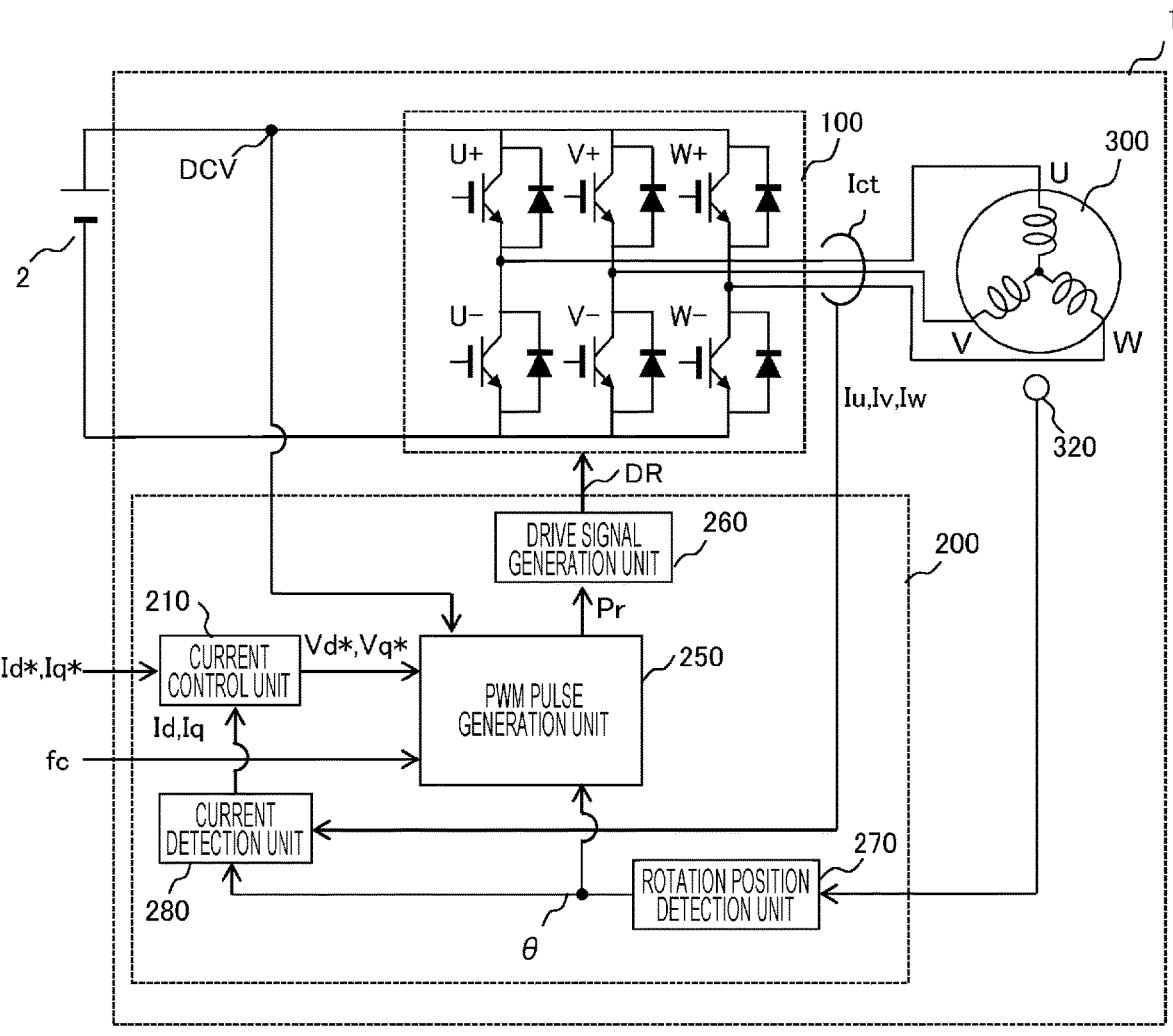
FIG. 1 is a block diagram illustrating a configuration of a motor device including an inverter control device according to a first embodiment of the present invention.

FIG. 1 is a block diagram illustrating a configuration of a motor device 1 including an inverter control device 200 according to a first embodiment of the present invention. The motor device 1, which is connected to a battery 2, includes an inverter 100, the inverter control device 200, and a motor 300.

The battery 2 is a direct current (DC) voltage source of the inverter 100. A DC voltage DCV of the battery 2 is converted into a three-phase alternating current (AC) voltage having a variable voltage and a variable frequency by the inverter 100, and is applied to the motor 300.

The motor 300 is a synchronous motor that is rotationally driven by supply of the three-phase AC voltage. A rotational position sensor 320 is attached to the motor 300 to control the phase of the three-phase AC voltage applied from the inverter 100 to the motor 300 in accordance with the phase of an induced voltage of the motor 300. Here, for example, a resolver including an iron core and a winding can be used as the rotational position sensor 320. Alternatively, the rotational position sensor 320 may be configured by using a giant magnetoresistive (GMR) sensor or a Hall element.

The inverter control device 200 includes a current control unit 210, a PWM pulse generation unit 250, a drive signal generation unit 260, a rotational position detection unit 270, and a current detection unit 280.

The rotational position detection unit 270 detects a rotational position θ of a rotor in the motor 300 based on an output signal from the rotational position sensor 320.

The current detection unit 280 acquires detection values (Iu, Iv, and Iw) of a three-phase current flowing through the motor 300 from a current sensor Ict, and obtains dq-axis current detection values (Id and Iq) by performing three-phase-to-two-phase conversion on these current detection values based on the rotational position θ detected by the rotational position detection unit 270.

The inverter control device 200 has a current control function for controlling an output from the motor 300. The current control unit 210 outputs voltage commands (Vd* and Vq*) so that the current detection values (Id and Iq) detected by the current detection unit 280 match current command values (Id* and Iq*) input from a host controller, not illustrated.

The PWM pulse generation unit 250 performs three-phase pulse width modulation (PWM) using the voltage commands (Vd* and Vq*) obtained by the current control unit 210, the DC voltage DCV of the battery 2, the rotational position θ, and a predetermined carrier frequency fc set in advance, and generates a PWM pulse signal Pr for controlling the inverter 100. Note that a specific method for generating the PWM pulse signal Pr using the PWM pulse generation unit 250 will be described later.

The drive signal generation unit 260 converts the PWM pulse signal Pr generated by the PWM pulse generation unit 250 into a drive signal DR and outputs the drive signal DR to the inverter 100. The inverter 100 includes a plurality of semiconductor switch elements respectively corresponding to the phases of the three-phase AC voltage, and the semiconductor switch elements are turned on or off by the drive signal DR. As a result, the output voltage from the inverter 100 is adjusted in accordance with the control of the inverter control device 200.

In the above description, the configuration example of the motor device 1 in a case where the current of the motor 300 is controlled in accordance with the current commands from the host controller has been described with reference to FIG. 1, but the configuration of FIG. 1 can be applied also to a case where another control method is used. For example, in the case of controlling the rotation speed of the motor 300, a motor rotation speed or is calculated based on a temporal change in the rotational position θ, and the voltage commands or the current commands are created to match speed commands from the host controller. Further, in a case of controlling an output torque from the motor 300, the current commands (Id* and Iq*) are created by using a relational expression or map of the motor currents (Id and Iq) and a motor torque.

Figure 2:
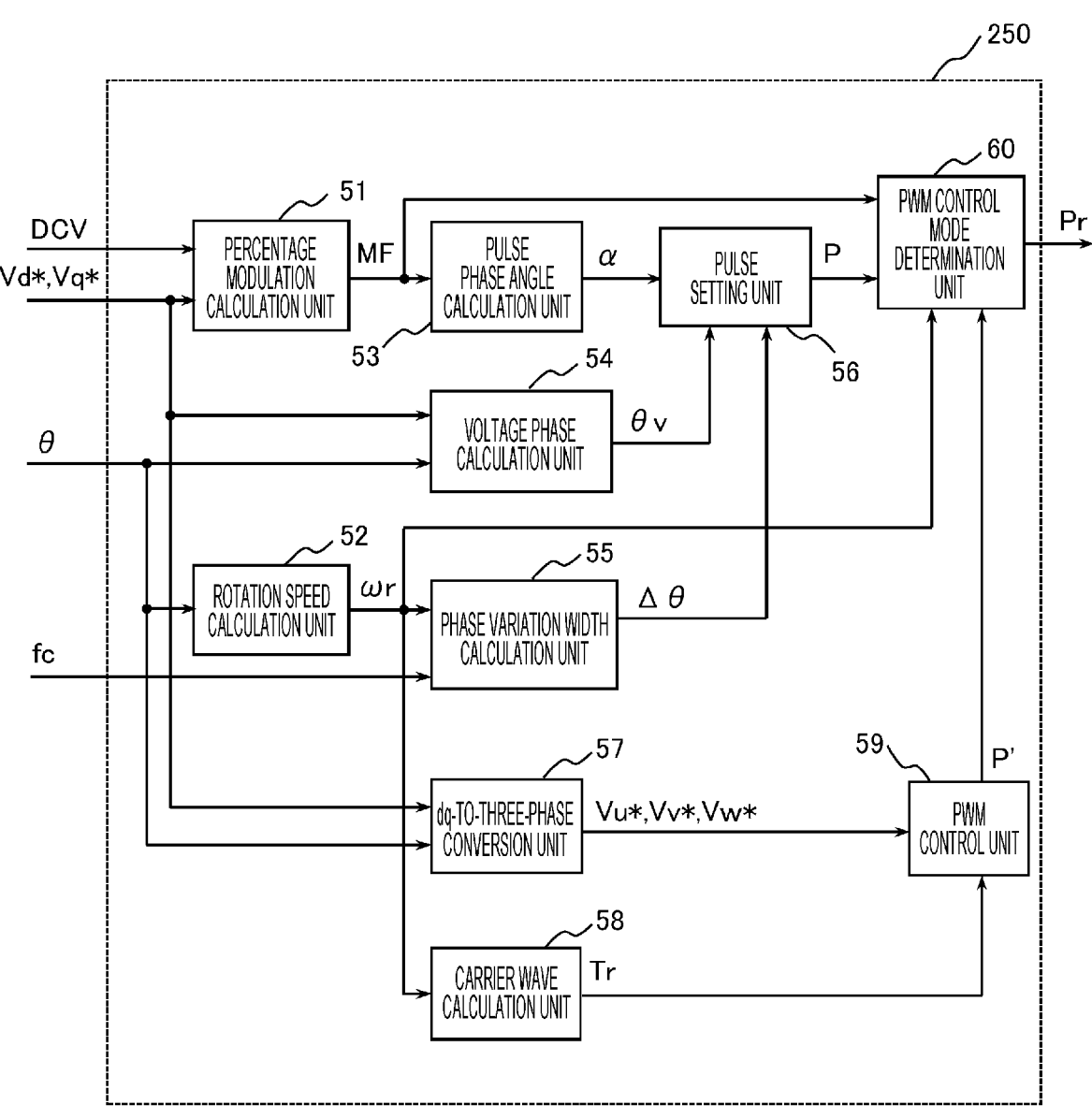
FIG. 2 is a block diagram illustrating a functional configuration of a pulse width modulation (PWM) pulse generation unit according to the first embodiment of the present invention.

Details of the method for generating the PWM pulse signal Pr using the PWM pulse generation unit 250 will be described below. FIG. 2 is a block diagram illustrating a functional configuration of the PWM pulse generation unit 250 according to the first embodiment of the present invention.

As illustrated in FIG. 2, the PWM pulse generation unit 250 has functional blocks including a percentage modulation calculation unit 51, a rotation speed calculation unit 52, a pulse phase angle calculation unit 53, a voltage phase calculation unit 54, a phase variation width calculation unit 55, a pulse setting unit 56, a dq-to-three-phase conversion unit 57, a carrier wave calculation unit 58, a PWM control unit 59, and a PWM control mode determination unit 60. The inverter control device 200 including the PWM pulse generation unit 250 is configured by, for example, a microcomputer, and can implement these functional blocks by executing predetermined programs in the microcomputer. Alternatively, some or all of these functional blocks may be implemented by using a hardware circuit such as a logic integrated circuit (IC) or a field-programmable grid array (FPGA).

The percentage modulation calculation unit 51 calculates a percentage modulation MF of the output voltage from the inverter 100 using the following equation (1) based on the DC voltage DCV of the battery 2 and the voltage command (Vd* and Vq*). Note that the percentage modulation MF represents a voltage amplitude ratio between DC power supplied from the battery 2 to the inverter 100 and AC power output from the inverter 100 to the motor 300.

[Mathematical Equation 1]

$$MF = \frac{\sqrt{v_d^{*2} + v_q^{*2}}}{\frac{2}{\pi}DCV} \tag{1}$$

The rotation speed calculation unit 52 calculates the motor rotation speed or representing the rotation speed (rotational speed) of the motor 300 based on the temporal change in the rotational position θ. Note that the motor rotation speed or may be a value represented by either an angular speed (rad/s) or revolutions per minute (rpm). In addition, these values may be mutually converted and used.

The pulse phase angle calculation unit 53 calculates a pulse phase angle α for switching an on or off state of the PWM pulse signal Pr based on the percentage modulation MF calculated by the percentage modulation calculation unit 51. Here, the plurality of pulse phase angles α is calculated in accordance with the number of pulses N of the PWM pulse signal Pr included in one cycle of a fundamental of the output voltage from the inverter 100. For example, when the number of the pulses N=3, pulse phase angles α1, α2, α1', and α2' expressed by the following equations (2) to (5) are calculated. Thus, each pulse width of the PWM pulse signal Pr can be set based on the percentage modulation MF.

$$\alpha1 = \arccos\{(1 + MF)/2\} \tag{2}$$

$$\alpha2 = \pi - \alpha1 \tag{3}$$

$$\alpha1' = \pi + \alpha1 \tag{4}$$

$$\alpha2' = 2\pi - \alpha1 \tag{5}$$

Note that the number of the pulses N can be set to an odd number of at least 3 or more, for example, and is set in advance in the inverter control device 200. Alternatively, the number of the pulses N may be optionally set by the user, or may be optionally switched in accordance with the operation state of the motor 300 or the like. The number of the pulse phase angles α calculated by the pulse phase angle calculation unit 53 is determined in accordance with the number of the pulses N, and the larger the number of the pulses N, the larger the number of the pulse phase angles α. In the present embodiment, a case where the number of the pulses N is three will be described.

Based on the voltage commands (Vd* and Vq*) and the rotational position θ, the voltage phase calculation unit 54 calculates a voltage phase θv corresponding to the phase angle of the voltage output from the inverter 100 with respect to the current command values (Id* and Iq*) input from the host controller. Here, for example, the voltage phase θv is calculated by the following equation (6).

$$\theta v = \theta + \arctan(Vq^*/Vd^*) \tag{6}$$

The phase variation width calculation unit 55 calculates a phase variation width Δθ of the output voltage from the inverter 100 in the control cycle of the inverter control device 200. Here, the control cycle of the inverter control device 200 represents a cycle in which the PWM pulse generation unit 250 generates the PWM pulse signal Pr, and is set in advance in accordance with the calculation performance of the microcomputer constituting the inverter control device 200, accuracy required for control of the motor 300, and the like. Based on the motor rotation speed ωr and the preset carrier frequency fc, the phase variation width calculation unit 55 calculates the phase variation width Δθ using the following equation (7), for example.

$$\Delta\theta = \omega r/fc \tag{7}$$

The pulse setting unit 56 sets the timing of each pulse edge present within a current control cycle based on the pulse phase angle α, the voltage phase θv, and the phase variation width Δθ obtained by the equations (2) to (7). Then, an asynchronous pulse signal P is generated by changing the signal voltage from on to off or from off to on in accordance with the set timing of each pulse edge. Note that details of the asynchronous pulse signal P generated by the pulse setting unit 56 will be described later.

The dq-to-three-phase conversion unit 57 performs three-phase conversion on the voltage commands (Vd* and Vq*) based on the rotational position θ, and calculates three-phase voltage commands Vu*, Vv*, and Vw* (a U-phase voltage command value Vu*, a V-phase voltage command value Vv*, and a W-phase voltage command value Vw*). As a result, the three-phase voltage commands Vu*, Vv*, and Vw* can be generated as modulated wave signals for the three-phase AC voltage. At this time, by selecting a modulation system other than the sine wave modulation, the three-phase voltage commands Vu*, Vv*, and Vw* may be generated with a waveform other than the sine wave, such as a waveform of a trapezoidal wave or a waveform obtained by superimposing a harmonic of a predetermined order on the sine wave.

The carrier wave calculation unit 58 determines a synchronous carrier frequency fcs synchronized with the rotation of the motor 300, based on the motor rotation speed ωr, and generates a carrier wave Tr that periodically changes at the synchronous carrier frequency fcs. Note that the carrier wave Tr may be either a triangular wave or a sawtooth wave. Further, in a case where the carrier frequency fcs is 15 or more times the frequency of the rotation of the motor 300, the carrier frequency fcs may not be synchronized with the rotation of the motor 300.

The PWM control unit 59 performs pulse width modulation on each of the three-phase voltage commands Vu*, Vv*, and Vw* output from the dq-to-three-phase conversion unit 57 using the carrier wave Tr output from the carrier wave calculation unit 58, and generates a synchronous pulse signal P' synchronized with the control cycle (carrier wave Tr). Hereinafter, this signal is simply referred to as a synchronous pulse signal P'.

The PWM control mode determination unit 60 selects either the asynchronous pulse signal P generated by the pulse setting unit 56 or the synchronous pulse signal P' generated by the PWM control unit 59, based on the percentage modulation MF and the motor rotation speed ωr. Thereafter, the selected asynchronous pulse signal P or synchronous pulse signal P' is output to the drive signal generation unit 260 as the PWM pulse signal Pr generated by the PWM pulse generation unit 250.

Specifically, for example, in a case where the percentage modulation MF and the motor rotation speed ωr are respectively within predetermined ranges, the PWM control mode determination unit 60 selects a synchronous mode in which a pulse signal is synchronous with the control cycle is set, and outputs the synchronous pulse signal P' as the PWM pulse signal Pr. On the other hand, in a case where the percentage modulation MF and the motor rotation speed ωr are out of the predetermined ranges, the PWM control mode determination unit 60 selects an asynchronous mode in which a pulse signal is asynchronous with the control cycle, and outputs the asynchronous pulse signal P as the PWM pulse signal Pr. That is, the PWM control mode determination unit 60 selectively outputs either the asynchronous pulse signal P or the synchronous pulse signal P' as the PWM pulse signal Pr based on the operation state of the motor 300. Note that, regardless of whether the synchronous mode or the asynchronous mode is selected, any modulation system among modulation system such as sine wave modulation, two-phase modulation, or trapezoidal wave modulation can be used.

Next, details of the asynchronous pulse signal P will be described. In the general pulse width modulation performed by the PWM control unit 59, the synchronous pulse signal P' as the PWM pulse signal Pr is generated based on a comparison result between the carrier wave Tr and the modulated wave signal. On the other hand, the asynchronous pulse signal P generated as the PWM pulse signal Pr by the pulse setting unit 56 is directly generated from the result of the calculation performed by the PWM pulse generation unit 250 without using the carrier wave Tr or the modulated wave signal. Specifically, the pulse phase angle calculation unit 53, the voltage phase calculation unit 54, and the phase variation width calculation unit 55 perform calculations using the above-described equations (2) to (7) to respectively obtain the pulse phase angle $\alpha$, the voltage phase $\theta v$, and the phase variation width $\Delta \theta$. The pulse setting unit 56 sets the timings of the pulse edges in the control cycles using these calculation results, respectively, thus generating the asynchronous pulse signal P, which is a PWM pulse asynchronous with the control cycle. Hereinafter, this signal is simply referred to as the asynchronous pulse signal P.

Figure 3:
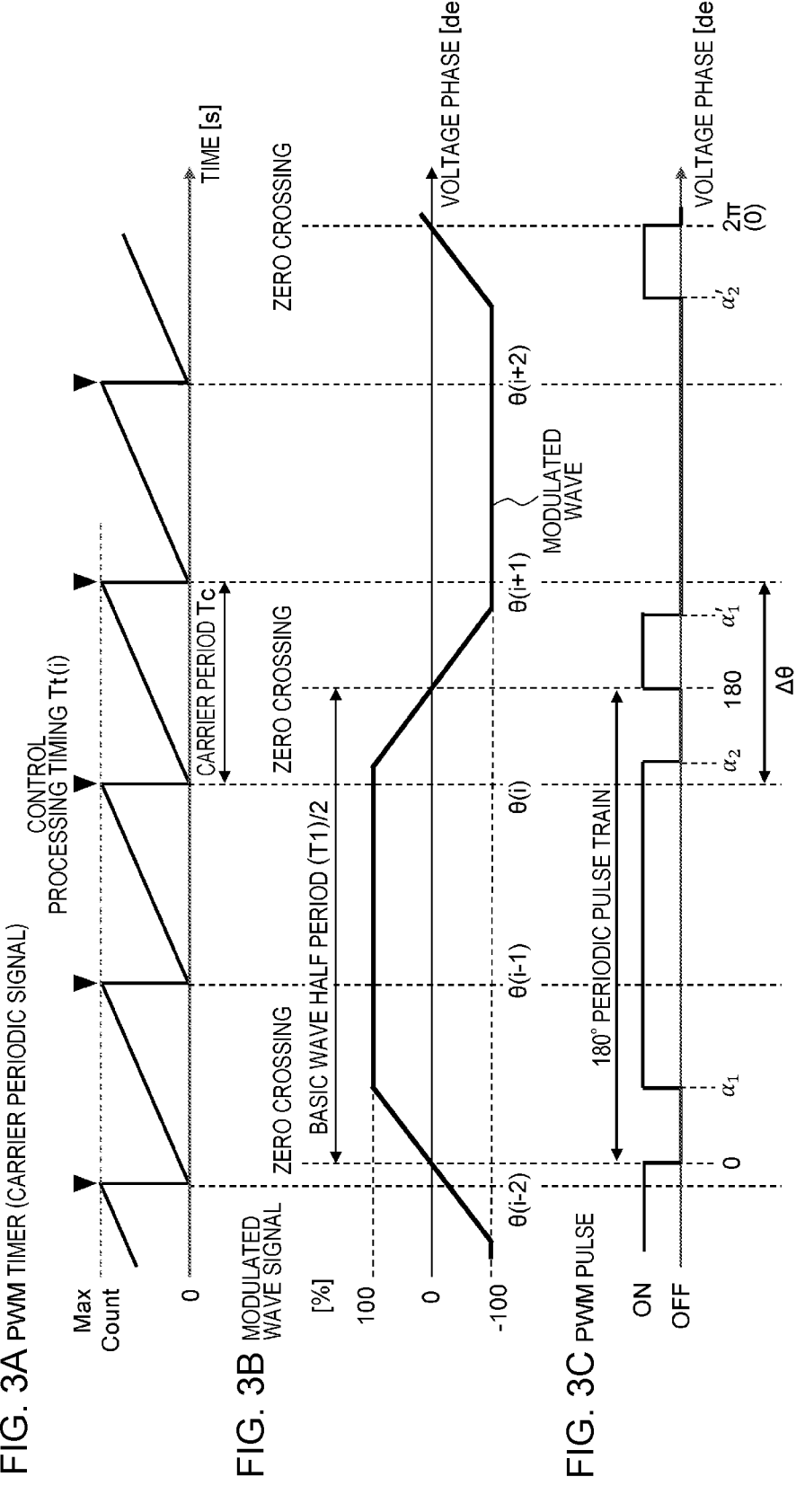
FIGS. 3A to 3C are explanatory diagrams of a method for generating an asynchronous pulse signal according to the first embodiment of the present invention.

FIG. 3 is an explanatory diagram of a method for generating the asynchronous pulse signal P according to the first embodiment of the present invention. In FIG. 3, a graph illustrated in (a) represents a counter value of a PWM timer, a graph illustrated in (b) represents a modulated wave signal, and a graph illustrated in (c) illustrates an example of a PWM pulse train output as the asynchronous pulse signal P. Note that the counter value of the PWM timer illustrated in FIG. 3(a) corresponds to the carrier wave Tr generated by the carrier wave calculation unit 58.

In the pulse setting unit 56, for example, as illustrated in FIG. 3(a), the asynchronous pulse signal P is generated by using the PWM timer in which the counter value periodically increases or decreases in a constant carrier cycle Tc. At this time, by making the carrier cycle Tc constant regardless of the motor rotation speed $\omega r$, the timing of the control processing related to the generation of the asynchronous pulse signal P can be made asynchronous with the control cycle in synchronization with the rotation of the motor 300. Note that, FIG. 3 illustrates an example of a sawtooth counting-up timer in which the counter value increases from 0 to a maximum value MaxCount at a constant rate and the counter value is reset to 0 in each carrier period Tc in accordance with the timing of the control processing. However, other types of PWM timer may be used as long as the value periodically increases or decreases in the constant carrier cycle Tc. For example, a counting-down timer in which the counter value changes in accordance with a waveform obtained by vertically inverting the counting-up timer, a triangular wave timer in which the counter value increases and decreases at a constant rate, or the like can be used as the PWM timer in the pulse setting unit 56.

In a case where the asynchronous pulse signal P generated by the PWM pulse generation unit 250 is output as the PWM pulse signal Pr to the drive signal generation unit 260, the inverter control device 200 performs control processing in synchronization with the carrier cycle Tc illustrated in FIG. 3(a). Specifically, the current detection unit 280 samples and holds a detection signal of the current sensor Ict at the timing synchronous with the carrier cycle Tc, and acquires the current detection values (Iu, Iv, Iw). Further, the rotational position detection unit 270 detects the output signal from the rotational position sensor 320 at the timing synchronous with the carrier cycle Tc, and acquires the rotational position $\theta$. The asynchronous pulse signal P is generated by performing the above-described calculation in each carrier cycle Tc using the acquired values.

Note that, in the sampling and holding operation of the detection signal of the current sensor Ict performed by the current detection unit 280, a voltage ripple occurs when the detection signal is charged to a capacitor of a sampling and holding circuit, and this voltage ripple is superimposed on an input terminal of an analog-to-digital (A-D) conversion circuit, resulting in an A-D conversion noise. The cycle of the A-D conversion noise is equivalent to the control cycle (carrier cycle Tc) of the inverter control device 200. The detection cycle of the current detection unit 280 can be made shorter than the control cycle to acquire a plurality of detection signals from the current sensor Ict per control cycle. However, for convenience of microcomputer processing, the sampling frequency (a reciprocal of the detection cycle) of the current detection unit 280 needs to be an integral multiple of the control frequency (a reciprocal of the control cycle) of the inverter control device 200. In any case, an integral multiple of the cycle of the A-D conversion noise can be regarded as the carrier cycle Tc which is the cycle of the PWM timer.

FIG. 3(b) illustrates an example of a modulated wave signal in the case of trapezoidal wave modulation. The cycle of the modulated wave corresponds to a fundamental cycle of the output voltage from the inverter 100. As described above, unlike the synchronous pulse signal P' obtained by general pulse width modulation, the PWM pulse generation unit 250 directly obtains the asynchronous pulse signal P with calculation. Therefore, the modulated wave signal is not necessarily required when the asynchronous pulse signal P is generated.

FIG. 3(c) illustrates an example of the asynchronous pulse signal P at a time of when the number of the pulses N=3 in the present embodiment. As for the asynchronous pulse signal P in the present embodiment, the on or off state of the signal is switched at a zero crossing point (phase angle 0°, 180°) at which the modulated wave is inverted from negative to positive or from positive to negative across 0 and at the phase angles $\alpha 1$, $\alpha 2$, $\alpha 1'$, and $\alpha 2'$. Note that the phase angles $\alpha 1$, $\alpha 2$, $\alpha 1'$, and $\alpha 2'$ are obtained by the above-described equations (2) to (5), respectively.

The pulse setting unit 56 generates the asynchronous pulse signal P illustrated in FIG. 3(c) in each carrier cycle Tc illustrated in FIG. 3(a) in accordance with the pulse train set in a 180 degree cycle of the electrical phase angle, based on the zero crossing point of the modulated wave illustrated in FIG. 3(b). Specifically, for example, in a case where this control processing timing is a control processing timing Tt(i) in FIG. 3(a), the pulse setting unit 56 generates the asynchronous pulse signal P in the range (phase variation width $\Delta \theta$) from a voltage phase $\theta(i)$ corresponding to the control processing timing to a voltage phase $\theta(i+1)$ corresponding to the next control processing timing. In the example of FIG. 3(c), since the phase angles $\alpha 2$ and $\alpha 1'$ and the zero crossing point (phase angle) 180° are included in this range, timer values corresponding to these phase angles are set in the PWM timer. Then, by changing the signal value of the asynchronous pulse signal P from ON to OFF or from OFF to ON at the timing when the count values of the PWM timer reach the corresponding set timer values, a pulse edge can be set and the asynchronous pulse signal P can be generated.

Figure 4:
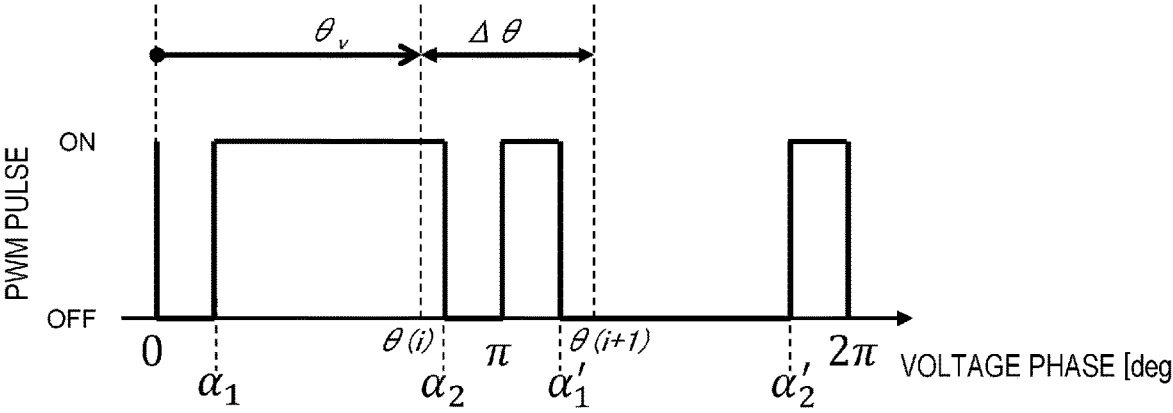
FIG. 4 is a diagram illustrating a range of an asynchronous pulse signal for one cycle of a modulated wave signal.

FIG. 4 is a diagram illustrating a range of the asynchronous pulse signal P of FIG. 3(c) for one cycle ($\theta$=0 to $2\pi$) of the modulated wave signal. As illustrated in FIG. 4, the asynchronous pulse signal P obtained by vertically inverting a pulse train waveform in the first half cycle ($\theta=0$ to $\pi$) including the pulse phase angles $\alpha1$ and $\alpha2$ matches a pulse train waveform in the second half cycle ($\theta=T$ to $2\pi$) including the pulse phase angles $\alpha1$ 'and $\alpha2$'. That is, the waveform of the asynchronous pulse signal P is symmetric with respect to the zero crossing point of the modulated wave signal. Therefore, the pulse train of the second half cycle can be set by inverting the pulse train of the first half cycle, and the asynchronous pulse signal P can be generated.

The PWM pulse generation unit 250 causes the voltage phase calculation unit 54 to calculate the voltage phase $\theta v$ corresponding to the voltage phase $\theta(i)$ at this control processing timing. In addition, the phase variation width calculation unit 55 calculates a phase variation width $\Delta\theta$ from the voltage phase $\theta(i)$ at this control processing timing to the voltage phase $\theta(i+1)$ at the next control processing timing. The pulse setting unit 56 can generate the asynchronous pulse signal P in accordance with the pulse phase angle $\alpha$ calculated by the pulse phase angle calculation unit 53 by setting the timer value corresponding to the pulse edge in this control processing in the PWM timer based on the calculated values $\theta v$ and $\Delta\theta$.

Figure 5:
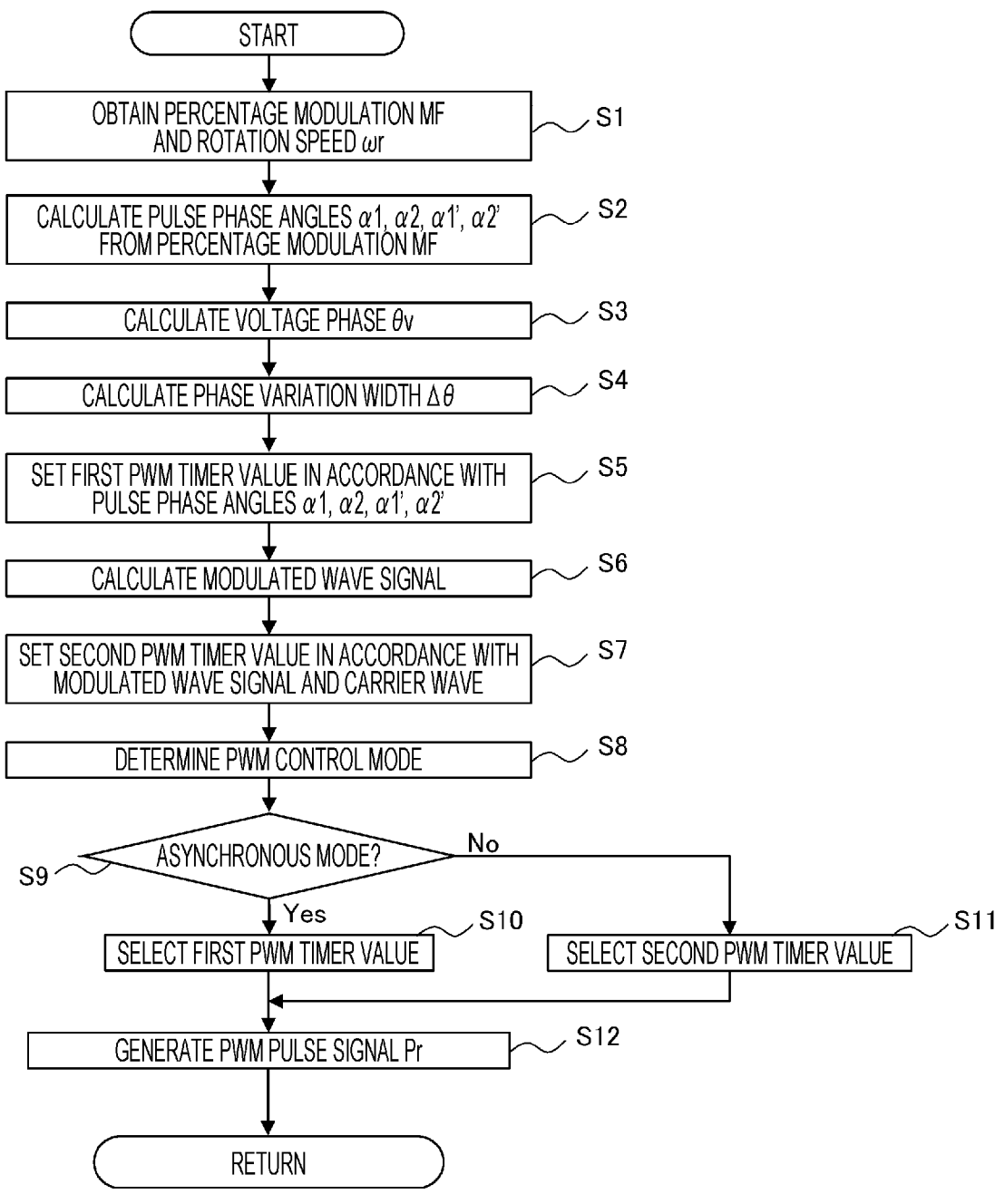
FIG. 5 is a flowchart of PWM pulse control according to the first embodiment of the present invention.

FIG. 5 is a flowchart of the PWM pulse control according to the first embodiment of the present invention. In the present embodiment, the PWM pulse generation unit 250 performs the PWM pulse control by executing processing illustrated in the flowchart of FIG. 5 in every predetermined control cycle corresponding to the carrier cycle Tc, and outputs the PWM pulse signal Pr to the drive signal generation unit 260.

In step S1, the PWM pulse generation unit 250 causes the percentage modulation calculation unit 51 and the rotation speed calculation unit 52 to respectively obtain the percentage modulation MF and the motor rotation speed or. Here, the percentage modulation MF and the motor rotation speed or can be calculated by using the above-described equations (1) and (2), respectively.

In step S2, the PWM pulse generation unit 250 causes the pulse phase angle calculation unit 53 to calculate the pulse phase angle $\alpha$ based on the percentage modulation MF obtained in step S1. Here, the number of switching times of the on or off state of the asynchronous pulse signal P per one cycle of the fundamental of the inverter output voltage is determined in accordance with the preset number of the pulses N, and a value obtained by subtracting a portion at the zero crossing point ($\theta=0$, $\pi$) of the fundamental of the inverter output voltage from the number of the switching times is set as the number of the pulse phase angles $\alpha$ to be calculated.

In the present embodiment, since the number of the pulses N=3 as described above, the number of the switching times of the on or off state of the asynchronous pulse signal P per one cycle of the fundamental of the inverter output voltage is calculated as 2N=6. When the portion at the zero crossing point of the fundamental of the inverter output voltage is subtracted from the number of the switching times, the number of the pulse phase angles $\alpha$ to be calculated is obtained as 6−2=4. Therefore, the processing in step S2 is performed by calculating each of the four pulse phase angles $\alpha1$, $\alpha2$, $\alpha1$', and $\alpha2$' respectively using the above-described equations (2) to (5).

In step S3, the PWM pulse generation unit 250 causes the voltage phase calculation unit 54 to calculate the voltage phase $\theta v$. Here, the voltage phase $\theta v$ in accordance with the phase angle of the inverter output voltage is calculated by using the above-described equation (6) based on the voltage commands (Vd* and Vq*) and the rotational position $\theta$ input respectively from the current control unit 210 and the rotational position detection unit 270.

In step S4, the PWM pulse generation unit 250 causes the phase variation width calculation unit 55 to calculate the phase variation width $\Delta\theta$. Here, based on the motor rotation speed or obtained in step S1 and the predetermined carrier frequency fc in accordance with the control cycle of the PWM pulse generation unit 250, the phase variation width $\Delta\theta$ of the inverter output voltage in the control cycle of the PWM pulse generation unit 250 is calculated by using the above-described equation (7).

In step S5, the PWM pulse generation unit 250 causes the pulse setting unit 56 to set a timer value (first PWM timer value) corresponding to the pulse phase angles $\alpha1$, $\alpha2$, $\alpha1$', and $\alpha2$' obtained in step S2 in the PWM timer. Here, as described above, a voltage phase range of the fundamental of the inverter output voltage included in the cycle from the current control processing timing to the next control processing timing is specified based on the voltage phase $\theta v$ and the phase variation width $\Delta\theta$ obtained respectively in steps S3 and S4. If any of the zero crossing point of the fundamental of the inverter output voltage (the zero crossing point of the modulated wave) and the pulse phase angles $\alpha1$, $\alpha2$, $\alpha1$', and $\alpha2$' obtained in step S2 is present within the specified voltage phase range, a timer value corresponding to the phase angle is set as the first PWM timer value in the PWM timer. In a case where a plurality of zero crossing points or pulse phase angles are included in the voltage phase range of the fundamental of the inverter output voltage, the first PWM timer value is set for each of the plurality of zero crossing points or pulse phase angles. As a result, the switching timing of the on or off state of the PWM pulse signal Pr can be set based on the pulse phase angle $\alpha$, the voltage phase $\theta v$, and the phase variation width $\Delta\theta$ obtained respectively in steps S2 to S4.

In step S6, the PWM pulse generation unit 250 causes the dq-to-three-phase conversion unit 57 to calculate modulated wave signals for the three-phase AC voltage. Here, as described above, three-phase conversion based on the rotational position $\theta$ is performed on the voltage commands (Vd* and Vq*) input from the current control unit 210, and thus the three-phase voltage commands Vu*, Vv*, and Vw* corresponding to the modulated wave signals can be generated.

In step S7, the PWM pulse generation unit 250 causes the PWM control unit 59 to perform pulse width modulation based on the modulated wave signal calculated in step S7, and set a timer value (second PWM timer value) corresponding to the result in the PWM timer. Here, the voltage phase angle of each pulse edge in the synchronous pulse signal P' is determined by performing known pulse width modulation on the modulated wave signal using the carrier wave Tr generated by the carrier wave calculation unit 58 in synchronization with the rotation of the motor 300, and the timer value corresponding to the voltage phase angle is set as the second PWM timer value in the PWM timer. Note that when the carrier wave Tr is 15 or more times the rotation of the motor 300, the carrier wave Tr may be asynchronous with the rotation of the motor 300.

In step S8, the PWM pulse generation unit 250 causes the PWM control mode determination unit 60 to determine the PWM control mode. Here, the operation state of the motor 300 is determined based on the percentage modulation MF and the motor rotation speed or obtained in step S1, and the PWM control mode suitable for the operation state is determined. Specifically, for example, as described above, in a case where the percentage modulation MF and the motor rotation speed or are within the predetermined range, a determination is made that the synchronous mode in which the pulse signal synchronous with the control cycle is controlled is an optimum PWM control mode. On the other hand, in a case where the percentage modulation MF or the motor rotation speed or is out of the predetermined range, a determination is made that the asynchronous mode in which the pulse signal asynchronous with the control cycle is controlled is the optimum PWM control mode. As a result, either the synchronous mode or the asynchronous mode can be selected as the optimum PWM control mode based on the operation state of the motor 300.

In step S9, the PWM pulse generation unit 250 determines whether the PWM control mode determined to be suitable for the operation state of the motor 300 in step S8 is the asynchronous mode. In a case where the mode selected as the optimum PWM control mode in step S8 is the asynchronous mode, the processing proceeds to step S10. In a case where the mode is not the asynchronous mode, that is, the mode is the synchronous mode, the processing proceeds to step S11.

In step S10, the PWM pulse generation unit 250 sets the first PWM timer value set in step S5 as a timer value used for generating the PWM pulse signal Pr. In this case, the asynchronous pulse signal P generated by the pulse setting unit 56 is selectively output as the PWM pulse signal Pr from the PWM pulse generation unit 250.

In step S11, the PWM pulse generation unit 250 sets the second PWM timer value set in step S7 as a timer value used for generating the PWM pulse signal Pr. In this the synchronous pulse signal P' generated by the PWM control unit 59 is selectively output as the PWM pulse signal Pr from the PWM pulse generation unit 250.

After execution of the processing in step S10 or S11, in step S12, the PWM pulse generation unit 250 generates the PWM pulse signal Pr using either the asynchronous pulse signal P or the synchronous pulse signal P', and outputs the PWM pulse signal Pr to the drive signal generation unit 260. That is, in a case where step S10 is executed, the asynchronous pulse signal P generated by the pulse setting unit 56 is output as the PWM pulse signal Pr, and in a case where step S11 is executed, the synchronous pulse signal P' generated by the PWM control unit 59 is output as the PWM pulse signal Pr. As a result, either the asynchronous pulse signal P or the synchronous pulse signal P' can be selectively output in accordance with the operation state of the motor 300.

Upon completion of the processing in step S12, the PWM pulse control illustrated in the flowchart of FIG. 5 is stopped, and the processing waits until a predetermined control cycle elapses. When the predetermined control cycle has elapsed and the next control timing comes, the PWM pulse generation unit 250 resumes the processing illustrated in the flowchart of FIG. 5 from step S1 and repeats the PWM pulse control.

Second Embodiment

A second embodiment of the present invention will be described below. In the present embodiment, a case where the number N of pulses per cycle of the fundamental of the inverter output voltage is five in the asynchronous pulse signal P will be described. Note that the configurations of the inverter control device and the motor control device and the functional configuration of the PWM pulse generation unit in the inverter control device in the present embodiment are respectively similar to those in FIGS. 1 and 2 described in the first embodiment. Therefore, the present embodiment will be described below with reference to the configurations in FIGS. 1 and 2.

Figure 6:
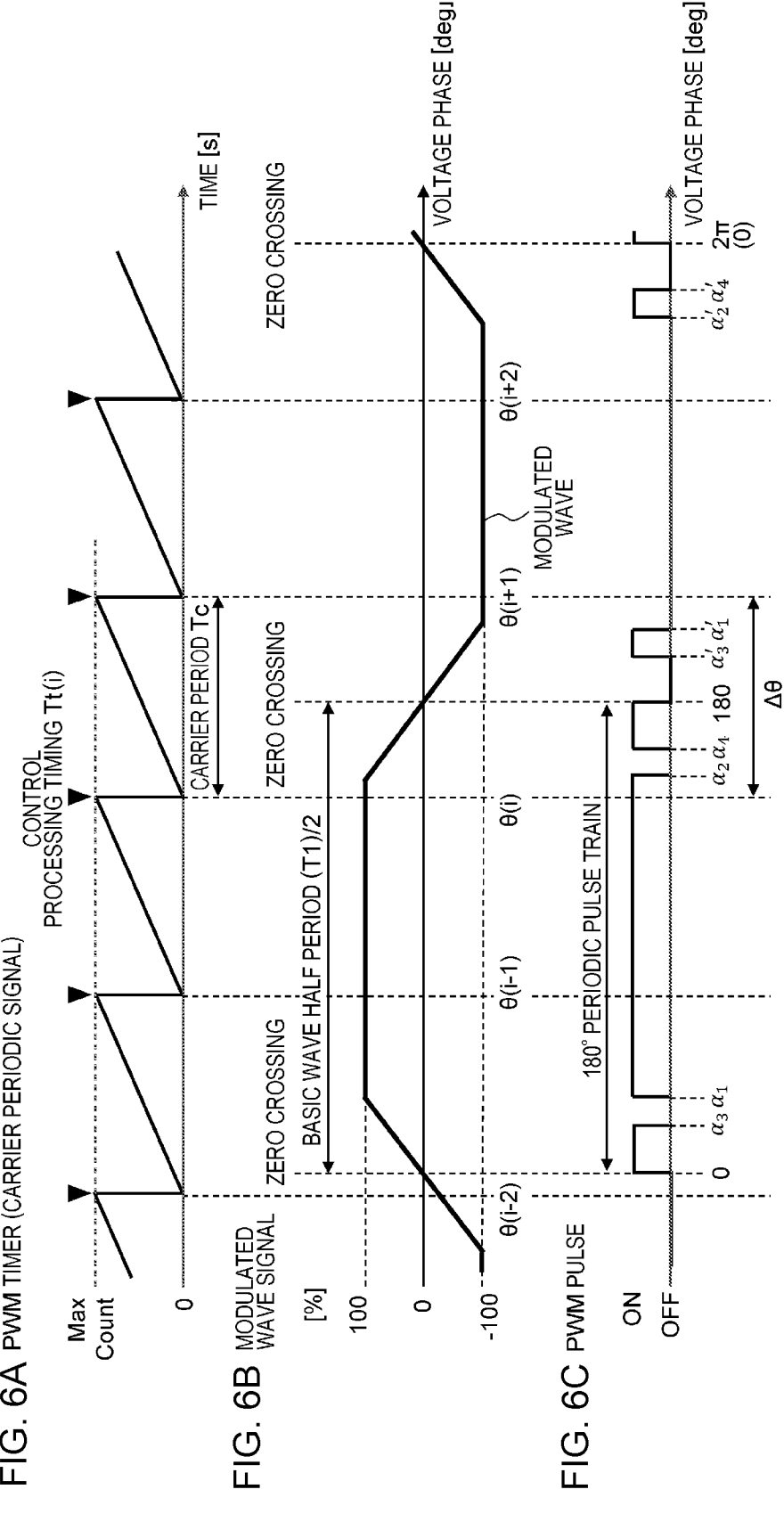
FIGS. 6A to 6C are explanatory diagrams of a method for generating an asynchronous pulse signal according to a second embodiment of the present invention.

FIG. 6 is an explanatory diagram of a method for generating the asynchronous pulse signal P according to the second embodiment of the present invention. In FIG. 6, a graph illustrated in (a) represents a counter value of a PWM timer, a graph illustrated in (b) represents a modulated wave signal, and a graph illustrated in (c) illustrates an example of a PWM pulse train output as the asynchronous pulse signal P. Note that the graphs in FIGS. 6(*a*) and 6(*b*) are identical to the graphs in FIGS. 3(*a*) and 3(*b*) described in the first embodiment.

FIG. 6(*c*) illustrates an example of the asynchronous pulse signal P in a case where the number of the pulses N=5 in the present embodiment. As for the asynchronous pulse signal P in the present embodiment, the on or off state of the signal is switched at a zero crossing point (phase angles 0° and 180°) at which the modulated wave is inverted from negative to positive or from positive to negative across 0 and at phase angles $\alpha1$, $\alpha2$, $\alpha3$, $\alpha4$, $\alpha1'$, $\alpha2'$, $\alpha3'$, and $\alpha4'$.

Among the above pulse phase angles, the pulse phase angles $\alpha1$, $\alpha2$, $\alpha1'$, and $\alpha2'$ are obtained respectively by the equations (2) to (5) described in the first embodiment. Note that the pulse phase angles $\alpha3$, $\alpha4$, $\alpha3'$, and $\alpha4'$ are obtained respectively by the following equations (8) to (11). In the equation (8), p indicates an optional number of $0<p<1$ and is set in advance.

$$\alpha3 = p \times \alpha1 \tag{8}$$

$$\alpha4 = \pi - \alpha3 \tag{9}$$

$$\alpha3' = \pi + \alpha3 \tag{10}$$

$$\alpha4' = 2\pi - \alpha3 \tag{11}$$

Figure 7:
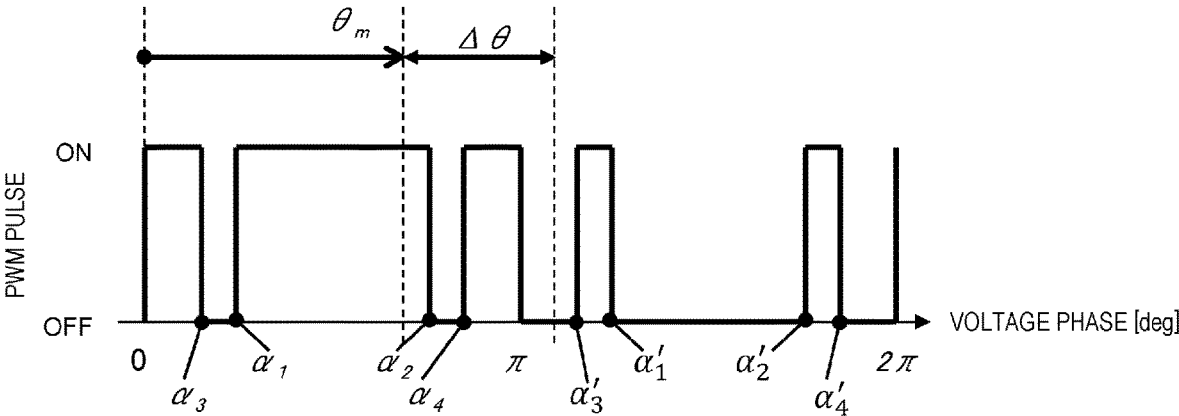
FIG. 7 is a diagram illustrating a range of an asynchronous pulse signal for one cycle of a modulated wave signal.

FIG. 7 is a diagram illustrating a range of the asynchronous pulse signal P in FIG. 6(*c*) for one cycle ($\theta=0$ to $2\pi$) of the modulated wave signal. As illustrated in FIG. 7, the asynchronous pulse signal P obtained by vertically inverting a pulse train waveform in the first half cycle ($\theta=0$ to $\pi$) including the pulse phase angles $\alpha1$, $\alpha2$, $\alpha3$, and $\alpha4$ matches a pulse train waveform in the second half cycle ($\theta=\pi$ to $2\pi$) including the pulse phase angles $\alpha1'$, $\alpha2'$, $\alpha3'$, and $\alpha4'$. That is, as in the first embodiment, the waveform of the asynchronous pulse signal P is symmetric with respect to the zero crossing point of the modulated wave signal also in the present embodiment. Therefore, the pulse train of the second half cycle can be set by inverting the pulse train of the first half cycle, and the asynchronous pulse signal P can be generated.

Figure 8:
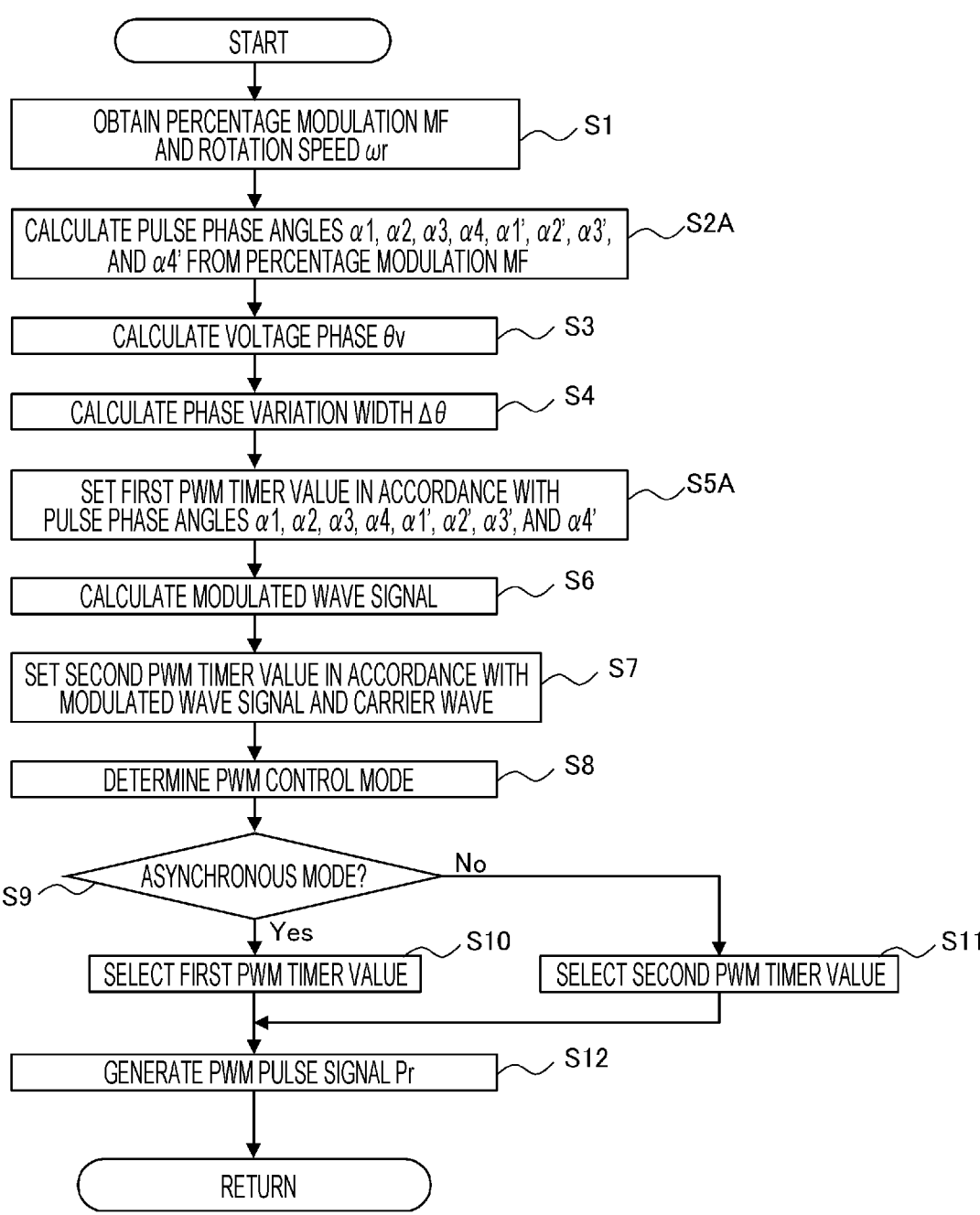
FIG. 8 is a flowchart of PWM pulse control according to the second embodiment of the present invention.

FIG. 8 is a flowchart of the PWM pulse control according to the second embodiment of the present invention. In the present embodiment, the PWM pulse generation unit 250 performs the PWM pulse control by executing processing illustrated in the flowchart of FIG. 8 in every predetermined control cycle corresponding to the carrier cycle Tc, and outputs the PWM pulse signal Pr to the drive signal generation unit 260.

Note that, in the flowchart of FIG. 8, the identical step numbers are assigned to portions that perform the processing identical to those in the flowchart of FIG. 5 described in the first embodiment. Hereinafter, the description of the processing with the step numbers identical to those in FIG. 5 will be omitted unless otherwise necessary.

In step S2A, the PWM pulse generation unit 250 causes the pulse phase angle calculation unit 53 to calculate the pulse phase angle α based on the percentage modulation MF obtained in step S1. Here, as in the first embodiment, the number of the switching times of the on or off state of the asynchronous pulse signal P per one cycle of the fundamental of the inverter output voltage is determined in accordance with the preset number of the pulses N, and a value obtained by subtracting the zero crossing point (θ=0, π) of the fundamental of the inverter output voltage from the number of the switching times is set as the number of the pulse phase angles α to be calculated.

In the present embodiment, since the number of the pulses N=5 as described above, the number of the switching times of the on or off state of the asynchronous pulse signal P per one cycle of the fundamental of the inverter output voltage is calculated to be 2N=10. When the zero crossing point of the fundamental of the inverter output voltage is subtracted from the number of the switching times, the number of the pulse phase angles α to be calculated is obtained as 10−2=8. Therefore, the processing in step S2A is performed by calculating each of the four pulse phase angles α1, α2, α1', and α2' using the above-described equations (2) to (5) and calculating each of the four pulse phase angles α3, α4, α3', and α4' using the above-described equations (8) to (11).

In step S5A, the PWM pulse generation unit 250 causes the pulse setting unit 56 to set a timer value (first PWM timer value) corresponding to the pulse phase angles α1, α2, α3, α4, α1', α2', α3', and α4' obtained in step S2A in the PWM timer. Here, as in the first embodiment, a voltage phase range of the fundamental of the inverter output voltage included in the period from the current control processing timing to the next control processing timing is specified based on the voltage phase θv and the phase variation width Δθ obtained respectively in steps S3 and S4. If any of the zero crossing point of the fundamental of the inverter output voltage (the zero crossing point of the modulated wave) and the pulse phase angles α1, α2, α3, α4, α1', α2', α3' and α4' obtained in step SZA is present within the specified voltage phase range, a timer value corresponding to the phase angle is set as the first PWM timer value to the PWM timer. As a result, the switching timing of the on or off state of the PWM pulse signal Pr can be set based on the pulse phase angle α, the voltage phase θv, and the phase variation width Δθ obtained respectively in steps S2A to S4.

As described above, in the embodiment of the present invention, while generating a PWM pulse signal asynchronous with the control cycle, the PWM pulse generation unit 250 generates the PWM pulse signal Pr to meet a pulse generation condition that at least three or more pulses exist in one cycle of the fundamental of the inverter output voltage in a zero crossing vicinity region including the zero crossing point of the modulated wave and that the on or off state of the PWM pulse signal is switched at the zero crossing point where the fundamental of the inverter output voltage changes across zero. This makes it possible to reduce the DC component and the lower-order harmonic component of the motor current generated in the operation state where the number of the pulses in the PWM pulse signal Pr is small, and thus noise and vibration of the motor 300 can be reduced.

Next, a configuration of an electric power steering device to which the inverter control device 200 described in one embodiment of the present invention is applied will be described with reference to FIG. 9.

Figure 9:
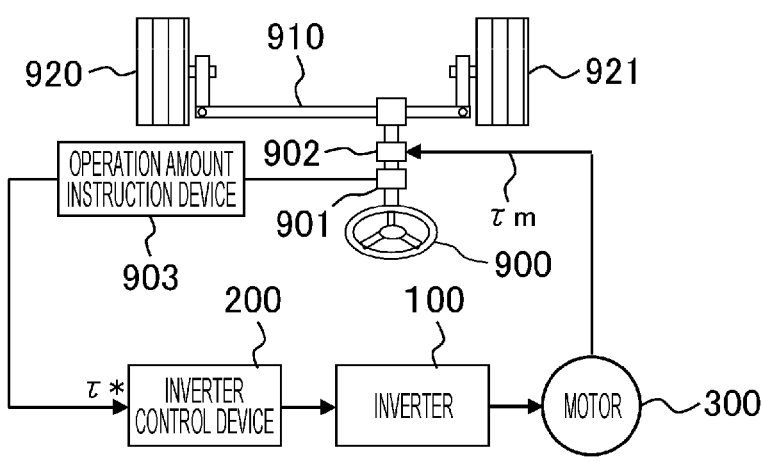
FIG. 9 is a configuration diagram of an electric power steering device to which an inverter control device is applied.

FIG. 9 is a configuration diagram of the electric power steering device to which the inverter control device 200 described in one embodiment of the present invention is applied.

As illustrated in FIG. 9, an electric actuator of the electric power steering includes a torque transmission mechanism 902, the motor 300, the inverter 100, and the inverter control device 200. The electric power steering device includes an electric actuator, a steering wheel (steering) 900, a steering detector 901, and an operation amount command unit 903. An operation force of the steering wheel 900 steered by a driver assists a torque using the electric actuator.

A torque command τ* of the electric actuator is generated by the operation amount command unit 903 as a steering assist torque command of the steering wheel 900. The steering force of the driver is reduced by using the output from the electric actuator driven by the torque command τ*. The inverter control device 200 receives the torque command τ* as an input command, and controls a current flowing through the motor 300 by controlling the operation of the inverter 100 in accordance with the torque command value based on a torque constant of the motor 300 and the torque command τ*.

A motor output τm output from an output shaft directly connected to a rotor of the motor 300 transmits a torque to a rack 910 of the steering device via the torque transmission mechanism 902 using a speed reduction mechanism such as a worm, a wheel, or a planetary gear, or a hydraulic mechanism. The torque transmitted to the rack 910 reduces (assists) the steering force (operation force) of the steering wheel 900 of the driver with the electric force to operate steering angles of the wheels 920 and 921.

The assist amount is determined as follows. That is, the steering angle and the steering torque are detected by the steering detector 901 incorporated in a steering shaft, and the torque command τ* is calculated by the operation amount command unit 903 in consideration of state quantities such as a vehicle speed and a road surface condition.

The inverter control device 200 according to one embodiment of the present invention has an advantage that vibration and noise can be reduced by averaging the output voltage from the inverter 100 even in a case where the motor 300 rotates at a high speed.

Figure 10:
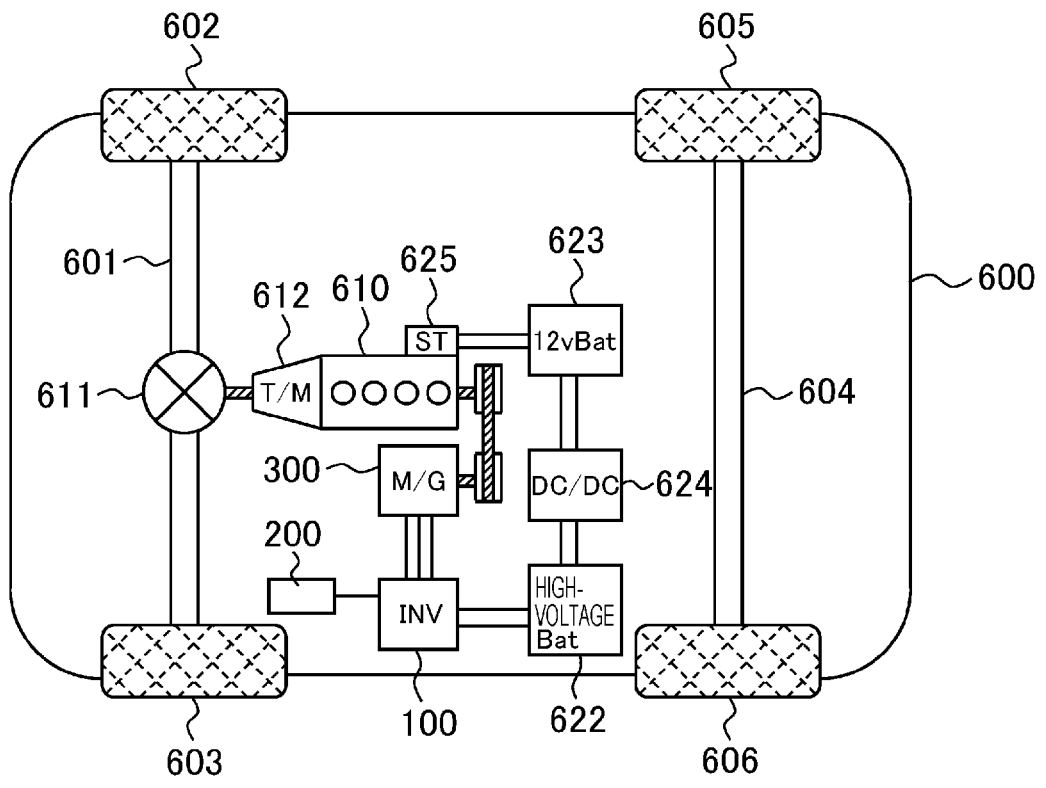
FIG. 10 is a configuration diagram of an electric vehicle to which the inverter control device is applied.

FIG. 10 is a diagram illustrating an electric vehicle 600 to which the inverter control device 200 of the present invention is applied. The electric vehicle 600 has a power train in which the motor 300 is used as a motor or generator.

A front axle 601 is pivotally supported on a front portion of the electric vehicle 600, and front wheels 602 and 603 are provided at both ends of the front axle 601. A rear axle 604 is pivotally supported on a rear portion of the electric vehicle 600, and rear wheels 605 and 606 are provided at both ends of the rear axle 604.

A differential gear 611 which is a power distribution mechanism is provided at a central portion of the front axle 601, and a rotational driving force transmitted from an engine 610 via a transmission 612 is distributed to the left and right of the front axle 601. The engine 610 and the motor 300 are mechanically connected via a belt stretched between pulleys provided on a crankshaft of the engine 610 and provided on the rotation shaft of the motor 300.

As a result, the rotational driving force of the motor 300 can be transmitted to the engine 610, and the rotational driving force of the engine 610 can be transmitted to the motor 300. The rotor is rotated by supplying the three-phase AC power output from the inverter 100 in accordance with the control of the inverter control device 200 to a stator coil of a stator, and the motor 300 generates a rotational driving force in accordance with the three-phase AC power.

That is, the motor 300 is operated as an electric motor by the inverter control device 200, whereas the motor is operated as a generator that generates three-phase AC power when the rotor is rotated by receiving a rotational driving force of the engine 610.

The inverter 100 is a power conversion device that converts DC power supplied from a high-voltage battery 622, which is a high-voltage (42 V or 300 V) system power supply, into three-phase AC power, and controls the three-phase AC current flowing through the stator coil of the motor 300 based on an operation command value and a magnetic pole position of the rotor.

The three-phase AC power generated by the motor 300 is converted into DC power by the inverter 100 to charge the high-voltage battery 622. The high-voltage battery 622 is electrically connected to a low-voltage battery 623 via a DC-DC converter 624. The low-voltage battery 623 constitutes a low voltage (14 v) system power supply of the electric vehicle 600, and is used as a power supply for a starter 625 for initially starting (cold starting) the engine 610, a radio, a light, and the like.

When the electric vehicle 600 is in a stop state such as waiting for a traffic light (idle stop mode), the engine 610 is stopped, and when the engine 610 is restarted (hot-started) at the time of re-departure, the motor 300 is driven by the inverter 100 to restart the engine 610.

Note that in the idle stop mode, in a case where the charging amount of the high-voltage battery 622 is insufficient or the engine 610 is not sufficiently warmed, the engine 610 is not stopped and continues to be driven. Further, during the idle stop mode, a drive source needs to be secured for auxiliary machines using the engine 610 as a drive source, such as a compressor of an air conditioner. In this case, the motor 300 is driven to drive the auxiliary machines.

Also in an acceleration mode or a high load operation mode, the motor 300 is driven to assist the driving of the engine 610. On the other hand, when the high-voltage battery 622 is in a charging mode requiring the charging, the engine 610 causes the motor 300 to generate power to charge the high-voltage battery 622. That is, the motor 300 performs a regenerative operation at the time of braking, deceleration, or the like of the electric vehicle 600.

The electric vehicle 600 includes the inverter control device 200 that generates a PWM pulse for converting a DC voltage into an AC voltage, based on a motor output request, the inverter 100 that converts a DC voltage into an AC voltage using the generated PWM pulse and drives the motor 300, and the DC-DC converter 624 that boosts a DC voltage. In the processing of the PWM pulse generation unit 250 as described above, the inverter control device 200 generates the PWM pulse signal Pr using a single pulse generation logic in the control mode of the synchronous 3 pulses and the synchronous 1 pulse synchronized with the rotation speed ωr of the motor 300 from the asynchronous PWM in which the rotation speed ωr of the motor 300 is asynchronous with the carrier wave Tr, and reduces an output voltage error of the inverter in the operation state where the number of the PWM pulses decreases. This makes it possible to reduce a DC component and a lower-order harmonic component of the motor current generated in a zero crossing vicinity region, and to achieve low noise and low vibration of the electric vehicle 600.

The inverter control device of the present invention described above has the following effects.

(1) The inverter control device 200 of the present invention includes the PWM pulse generation unit 250 that generates the PWM pulse signal Pr for controlling the inverter 100 in every predetermined control cycle. While generating a PWM pulse signal asynchronous with the control cycle, the PWM pulse generation unit 250 generates the PWM pulse signal Pr so as to meet the pulse generation condition that at least three or more pulses exist in one cycle of the fundamental of the output voltage from the inverter 100 and that the on or off state of the PWM pulse signal Pr is switched at the zero crossing point where the fundamental changes across zero. This makes it possible to reduce a DC component and a lower-order harmonic component of the inverter output current generated in the zero crossing vicinity region. This makes it possible to reduce the DC component and the lower-order harmonic component of the inverter output current generated in the operation state of the motor where the number of the PWM pulses is small.

(2) In the inverter control device 200 of the present invention, the PWM pulse generation unit 250 calculates the percentage modulation MF of the inverter output voltage (step S1), and sets each pulse width of the PWM pulse signal Pr based on the percentage modulation MF (step S2). With this configuration, the PWM pulse signal Pr can be easily generated by calculation processing using a microcomputer or the like.

(3) The PWM pulse generation unit 250 includes the percentage modulation calculation unit 51 that calculates the percentage modulation MF, the pulse phase angle calculation unit 53 that calculates the pulse phase angle α for switching the on or off state of the PWM pulse signal Pr based on the percentage modulation MF, the voltage phase calculation unit 54 that calculates the voltage phase θv in accordance with a phase angle of an inverter output voltage, the phase variation width calculation unit 55 that calculates the phase variation width Δθ of the inverter output voltage in the control cycle of the inverter control device 200, and the pulse setting unit 56 that sets a switching timing of the on or off state of the PWM pulse signal Pr based on the pulse phase angle α, the voltage phase θv, and the phase variation width Δθ. Thus, the PWM pulse signal Pr that meets the above pulse generation condition can be generated by calculation processing using a microcomputer or the like.

(4) The inverter 100 is connected to the motor 300. Based on the operation state of the motor 300, the PWM pulse generation unit 250 selectively outputs either the first PWM pulse signal (asynchronous pulse signal P) that meets the pulse generation condition described above or the second PWM pulse signal (synchronous pulse signal P') based on the comparison between the voltage commands (Vd* and Vq*) to the inverter 100 and the carrier signal (carrier wave Tr) that periodically changes in a predetermined carrier cycle Tc (steps S8 to S12). Therefore, the optimum PWM control mode is selected based on the operation state of the motor 300, and the PWM pulse signal Pr corresponding to the selected PWM control mode is output from the PWM pulse generation unit 250 to the drive signal generation unit 260. This enables the control of the inverter 100.

(5) The PWM pulse generation unit 250 generates the PWM pulse signal Pr so that the number of the pulses existing in one cycle of the fundamental of the inverter output voltage is an odd number. This makes it possible to generate the PWM pulse signal Pr that can reliably reduce the lower-order harmonic component of the inverter output voltage.

Although the case where the electric vehicle 600 according to one embodiment is a hybrid vehicle has been described, a similar effect can be produced also in a case of a plug-in hybrid vehicle, an electric vehicle or the like.

Further, in the above-described embodiment, the inverter control device alone has been described, but the present invention can also be applied to an inverter device where an inverter control device and an inverter are integrated or a motor drive system where an inverter device and a motor are integrated as long as such a device or system has the above-described functions.

Note that the present invention is not limited to the above-described embodiments, and various modifications can be made without departing from the gist of the present invention.

REFERENCE SIGNS LIST 1 motor device
2 battery
51 percentage modulation calculation unit
52 rotation speed calculation unit
53 pulse phase angle calculation unit
54 voltage phase calculation unit
55 phase variation width calculation unit
56 pulse setting unit
57 dq-to-three-phase conversion unit
58 carrier wave calculation unit
59 PWM control unit
60 PWM control mode determination unit
100 inverter
200 inverter control device
210 current control unit
250 PWM pulse generation unit
260 drive signal generation unit
270 rotational position detection unit
280 current detection unit
300 motor
320 rotational position sensor
600 electric vehicle
The invention claimed is:

1. An inverter control device comprising:
a pulse width modulation (PWM) pulse generation unit that generates a PWM pulse signal for controlling an inverter in every predetermined control cycle,
wherein the PWM pulse generation unit generates the PWM pulse signal to meet a pulse generation condition that at least three or more pulses exist in one cycle of a fundamental of an output voltage from the inverter and a state of the PWM pulse signal is switched between on and off at a zero crossing point at which the fundamental changes across zero while generating a PWM pulse signal asynchronous with the control cycle, wherein the PWM pulse generation unit calculates percentage modulation of the output voltage and sets pulse widths of the PWM pulse signal based on the percentage modulation.

2. The inverter control device according to claim 1, wherein
the PWM pulse generation unit includes
a percentage modulation calculation unit that calculates the percentage modulation,
a pulse phase angle calculation unit that calculates a pulse phase angle for switching an on or off state of the PWM pulse signal, based on the percentage modulation,
a voltage phase calculation unit that calculates a voltage phase in accordance with a phase angle of the output voltage,
a phase variation width calculation unit that calculates a phase variation width of the output voltage in the control cycle, and
a pulse setting unit that sets a switching timing of the on or off state of the PWM pulse signal based on the pulse phase angle, the voltage phase, and the phase variation width.

3. The inverter control device according to claim 1, wherein
the inverter is connected to a motor, and
the PWM pulse generation unit selectively outputs either a first PWM pulse signal that meets the pulse generation condition or a second PWM pulse signal based on a comparison between a voltage command to the inverter and a carrier signal that periodically changes in a predetermined carrier cycle, based on an operation state of the motor.

4. The inverter control device according to claim 1, wherein the PWM pulse generation unit generates the PWM pulse signal so that a number of pulses existing in one cycle of the fundamental of the output voltage is an odd number.

5. An electric power steering system comprising:
the inverter control device according to claim 1;
the inverter that is controlled by the inverter control device; and
an alternating current (AC) motor that is driven by the inverter,
wherein the AC motor controls steering of a vehicle.

6. An electric vehicle system comprising:
the inverter control device according to claim 1;
the inverter that is controlled by the inverter control device; and
an alternating current (AC) motor that is driven by the inverter,
wherein the AC motor causes the electric vehicle system to travel using a drive force.

* * * * *